United States Patent
Park et al.

(10) Patent No.: US 8,000,537 B2
(45) Date of Patent: Aug. 16, 2011

(54) OPTICAL VISION CHIP (OVC) AND IMAGE RECOGNITION METHOD USING THE SAME

(75) Inventors: Sahnggi Park, Daejeon (KR); Won Pil Yu, Ulsan (KR); Kwang Ryong Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 958 days.

(21) Appl. No.: 11/930,507

(22) Filed: Oct. 31, 2007

(65) Prior Publication Data
US 2008/0131032 A1 Jun. 5, 2008

(30) Foreign Application Priority Data

Dec. 5, 2006 (KR) .................. 10-2006-0122565
Jun. 13, 2007 (KR) .................. 10-2007-0058000

(51) Int. Cl.
*G06K 9/74* (2006.01)
(52) U.S. Cl. .................. 382/212; 382/218; 382/278
(58) Field of Classification Search .................. 382/278, 382/209, 212, 213, 214, 217, 218, 219; 359/561
See application file for complete search history.

(56) References Cited

U.S. PATENT DOCUMENTS
4,995,090 A * 2/1991 Singh et al. .................. 382/213
5,987,188 A * 11/1999 Freyre .................. 382/278

FOREIGN PATENT DOCUMENTS
JP 2003-23573 1/2003
JP 2004-362460 12/2004
KR 10-2006-0082223 7/2006

OTHER PUBLICATIONS

Masaki. "Real-Time Vision Chips." Proceedings of the International Conference on Industrial Electronics, Control and Instrumentation, Oct. 28, 1991, pp. 119-122.*
Baber et al., Cooperative Autonomous Driving, Intelligent Vehicles Sharing City Roads, IEEE Robotics & Automation Magazine, Mar. 2005, pp. 44-49.
Kak et al., Robotic Vision: What Happened to the Visions of Yesterday? 2002 IEEE, pp. 839-847.
Wong et al., Robotic Vision: 3D Object Recognition and Pose Determination, Proceedings of the 1998 IEEE/RSJ, Intl. Conference on Intelligent Robot and Systems, Victoria, B.C., Canada, Oct. 1998, pp. 1202-1209.
Dudek et al., A General-Purpose Processor-per Pixel Analog SIMD Vision Chip, IEEE Transactions on Circuits and Systems-I: Regular Papers, vol. 52, No. 1, Jan. 2005, pp. 13-20.
Komuro et al., A dynamically Reconfigurable SIMD Processor for a Vision Chip, IEEE Journal of Solid-Stat Circuits, vol. 39, No. 1, Jan. 2004, pp. 265-268.

(Continued)

*Primary Examiner* — Jon Chang
(74) *Attorney, Agent, or Firm* — Rabin & Berdo, P.C.

(57) ABSTRACT

Provided are an optical vision chip (OVC) and an image recognition method using the OVC. The OVC includes: a first display displaying an object image; a second display displaying a standard model image; and an optical sensor optically or electrically coupling the object image and the standard model image respectively displayed on the first and second displays and outputting a difference between the object image and the standard model image as an electrical signal.

10 Claims, 6 Drawing Sheets

OTHER PUBLICATIONS

Park et al., Edge and Motion Detection Using a Bio-Inspired CMOS Vision Chip Robust to Device Mismatches, IEEE Int. Conf. Neural Network & Processing, Nanjing, China, Dec. 14-17, 2003, pp. 341-344.

Akita et al, An Image Sensor with Fast Objects' Positions Extraction Function, IEEE Transactions on Electron Devices, vol. 50, No. 1, Jan. 2003, pp. 184-190.

Rodriguez-Vázques et al., ACE16k: The Third Generation of Mixed-Signal SIMD-CNN ACE Chips Toward VSoCs, IEEE Transactions on Circuits and Systems-I: Regular Papers, vol. 51, No. 5, May 2004, pp. 851-863.

Zhou et al., Shape Recognition from Three-dimensional Point Measurements with Range and Direction Uncertainty, Optical Engineering, vol. 44(12), Dec. 2005, pp. 127202-1 ~ 127202-9.

* cited by examiner

OPTICAL VISION CHIP (OVC) AND IMAGE RECOGNITION METHOD USING THE SAME

CROSS-REFERENCE TO RELATED PATENT APPLICATION

This application claims the benefit of Korean Patent Application Nos. 10-2006-0122565, filed on Dec. 5, 2006 and 10-2007-0058000, filed on Jun. 13, 2007 in the Korean Intellectual Property Office, the disclosures of which are incorporated herein in its entirety by reference.

BACKGROUND OF THE INVENTION

1. Field of the Invention

The present invention relates to a vision chip, and more particularly, to an optical vision chip (OVC). This work was supported by the IT R&D program of MIC/IITA. [2005-S-051-02, Photonic device integrated module for optical access network]

2. Description of the Related Art

Like human observation and recognition of objects and their identification, computer recognition of objects is a vital future industry, and also, the computer recognition of digital images will become core techniques of future robots and applicable to the automobile industry.

Research on digital image recognition has concentrated on the development of software based on a digital image processing theory rather than hardware. Such software transforms a 3 dimensional (3-D) object into a 2 dimensional (2-D) optical image, converts the 2-D optical image into an electrical digital signal, and analogizes the original 3-D object from the electrical digital signal. The image recognition method depends on such software and has a different image recognition structure from humans or animals. Thus, the image recognition method still has some initial difficulties.

The digital image processing theory uses an edge detection and recognition method to recognize images, and such methods pre-store standard models of various kinds of objects, detect an edge of an object that is to be newly recognized, compare the edge of the object with edges of the pre-stored standard models, and recognize an identity of the object.

The edge detection and recognition method used in the digital image processing theory is based on complicated mathematical calculations. In other words, the edge detection and recognition method includes a process of dividing an edge of an object into several areas, fitting edges of the several areas to a straight or curved line equation, and detecting constants of a function of the straight or curve line equation. In this method, the edge detection and recognition algorithms of objects are complicated, and also, complexity, accuracy, speediness, etc. of calculations for detecting and recognizing an edge are complicated and limited.

Semiconductor chips used in the edge detection and recognition method are referred to as vision chips, and such a vision chip has a chip structure in which a parallel operation is performed in order to minimize time required for inputting and outputting data. The vision chip also includes a photodiode (PD), a processing element (PE), and a random access memory (RAM) inside a single pixel, and the vision chip has a difficulty recognizing an image due to the limits of the digital image processing theory as described above.

SUMMARY OF THE INVENTION

The present invention provides an optical vision chip (OVC) capable of comparing an image of an object with a standard model image and outputting a difference between the image and the standard model image as an electrical signal so as to recognize the image of the object without using an edge detection and recognition method, and an image recognition method using the OVC.

According to an aspect of the present invention, there is provided an OVC including: a first display displaying an object image; a second display displaying a standard model image; and an optical sensor optically or electrically coupling the object image and the standard model image respectively displayed on the first and second displays and outputting a difference between the object image and the standard model image as an electrical signal.

The first display may be a first display device including a plurality of first pixels, the second display may be a second display device comprising a plurality of second pixels, and the optical sensor may include a plurality of sensor pixels. The first and second display devices and the optical sensor may be sequentially stacked so as to arrange and adhere the first, second, and sensor pixels having the same size.

The first display may be a first sub pixel of a display device, the second display may be a second sub pixel of the display device, and the display device may include a plurality of pixels comprising the first and second sub pixels. The display device and the optical sensor may be sequentially stacked so as to arrange and adhere the pixels and the sensor pixels having the same size.

The first display may be a first display device including a plurality of first pixels, the second display may be a second display device including a plurality of second pixels. And the optical sensor may include a first optical sensor adhered to the first display device and comprising a plurality of first sensor pixels and a second optical sensor adhered to the second display device and comprising a plurality of sensor pixels. The first display device, the first optical sensor, the second optical sensor, and the second display device may be sequentially stacked so as to arrange and adhere the first pixels, the first sensor pixels, the second sensor pixels, and the second pixels having the same size.

According to another aspect of the present invention, there is provided an image recognition method including: displaying an object image on a first display of an OVC; displaying a standard model image on a second display of the OVC; optically or electrically coupling the object image to the standard model image; outputting a difference between the object image and the standard model image as an electrical signal; analyzing the electrical signal based on the difference to determine whether the difference is greater or less than a reference value; and if the difference is greater than the reference value, displaying a second standard model image on the second display and repeat the previous operations, and if the difference is less than the reference value, recognizing the object image as an object equal to the standard model image or as a new object.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
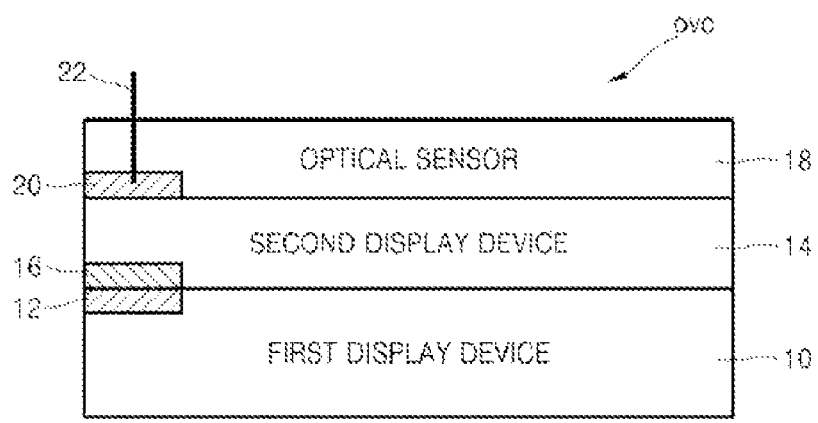
FIG. 1 is a cross-sectional view of an optical vision chip (OVC) according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

The present invention provides an optical vision chip (OVC), not a vision chip, used in an edge detection and recognition method. The OVC directly compares an image of an object that is to be recognized with a standard model image of the object and outputs a difference therebetween as an electrical signal so as to recognize the image of the object according to the electrical signal. This concept is included in the scope of the present invention.

Figure 2:
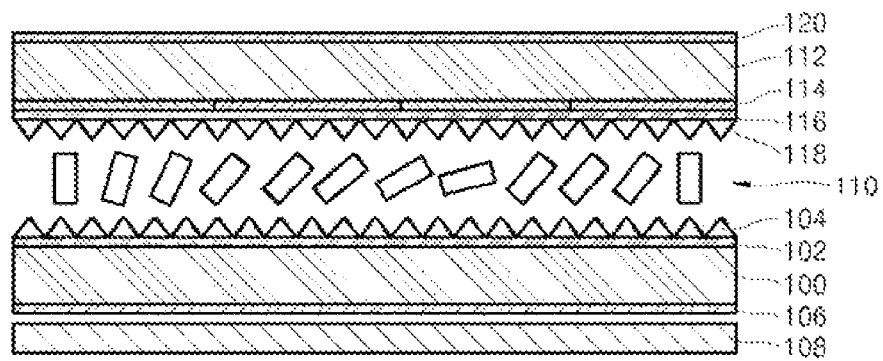
FIGS. 2 and 3 respectively are cross-sectional views of first and second display devices of FIG. 1.
Figure 3:
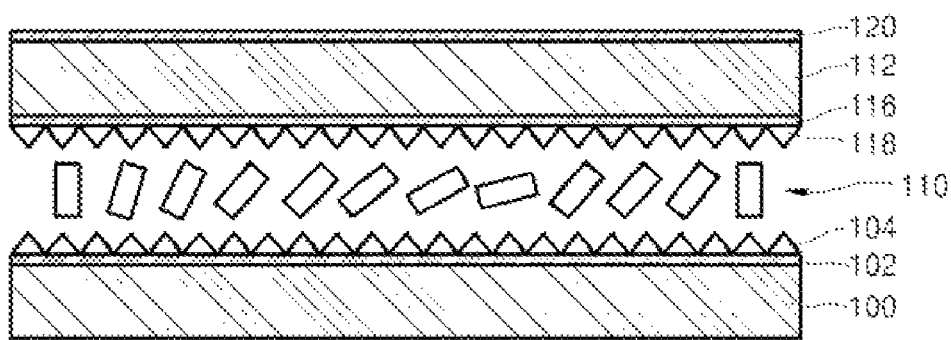

FIG. 1 is a cross-sectional view of an OVC according to an embodiment of the present invention, and FIGS. 2 and 3 respectively are cross-sectional views of a first display device 10 and a second display device 14 of FIG. 1.

The OVC has a structure in which the first display device 10, the second display device 14, and an optical sensor 18 are sequentially stacked. First and second pixels 12 and 16 of the first and second display devices 10 and 14 and a sensor pixel 20 of the optical sensor 18 are formed to appropriate sizes and shapes to vertically and accurately overlap with one another. For convenience, only one first pixel 12, one second pixel 16, and one sensor pixel 20 are shown in FIG. 1. However, the present embodiment of the present invention is not limited thereto, and a plurality of first pixels, a plurality of second pixels, and a plurality of sensor pixels may be formed.

The first and second display devices 10 and 14 may be liquid crystal displays (LCDs), plasma display panels (PDPs), organic lighting emitting diodes (OLEDs), or cathode-ray tubes (CRTs), which are generally used as display devices. More preferably, the first and second display devices 10 and 14 may be LCDs. The first display device 10 is shown in FIG. 2, and the first display device 10 includes an electrode 102, including a thin film transistor (TFT), formed on a lower glass substrate 100, and a first orientation layer 104 that is formed on the electrode 102. The electrode 102 is formed of indium tin oxide (ITO). A first polarizer 106 is formed on a bottom surface of the lower glass substrate 100, and a back light 108 is formed underneath the first polarizer 106.

An upper glass substrate 112 is formed above the lower glass substrate 100 so that a liquid crystal layer 110 is interposed between the lower and upper glass substrates 100 and 112 to change polarized light. A color filter 114, an electrode 116, and a second orientation layer 118 are formed on a bottom surface of the upper glass substrate 112. The electrode 116 is formed of ITO. A second polarizer 120 is formed on a top surface of the upper glass substrate 112.

The second display device 14, as shown in FIG. 3, has a simple function of adjusting the amount of transmitted light and may be an LCD. Since the second display device 14 adjusts the amount of the transmitted light as described above, the second display device 14 has the same structure as the first display device 10 except for the first polarizer 106 and the back light 108 as shown in FIG. 3. The second display device 14 shown in FIG. 3 does not include a color filter 114, however, may include the color filter 114.

The optical sensor 18 may be a complementary metal-oxide semiconductor (CMOS) sensor or a charge-coupled device (CCD) sensor. More preferably, the optical sensor 18 may be the CMOS sensor capable of performing a random access. As previously described, the size of the sensor pixel 20 of the optical sensor 18 is the same as those of the first and second pixels 12 and 16 of the first and second display devices 10 and 14. As a result, the first and second pixels 12 and 16 and the sensor pixel 20 are arranged to accurately overlap with one another.

An image recognition method using the OVC will now be described.

An object image is displayed on the first display device 10. A standard model image that is stored in an external memory is displayed on the second display device 14. When the standard model image is displayed on the second display device 14, the brightness magnitude of the standard model image is displayed as a complementary to the object image. The optical sensor 18 outputs an electrical signal indicating an optical difference between the object image and the standard model image through an electrode line 22. If the electrical signal output from the optical sensor 18 is transmitted to an external display device (not shown), the optical difference may be displayed on the external display device.

For example, a method of displaying the optical difference using the OVC will now be described. It is assumed that the first and second pixels 12 and 16 of the first and second display devices 10 and 14 each have a 10 grade brightness from "0" to "1." If the object image accurately coincides with the standard model image, the brightness of light incident onto the sensor pixel 20 of the optical sensor 18 is possible from "0" only to "0.25."

In other words, the brightness of the first pixel 12 of the object image is "0.2," a complementary brightness of the standard model image is 0.8 (eight grades of 10 grades). Thus, the brightness of the light incident onto the sensor pixel 20 of the optical sensor 18 is "0.016," which is obtained by the product of the brightnesses of the object image and the standard model image. Also, if the brightness of the first pixel 12 of the object image is "0.5," and the complementary brightness of the standard model image is "0.5," the brightness of the light incident onto the sensor pixel 20 of the optical sensor 18 is maximally "0.25", which is obtained by the product of the brightnesses of the object image and the standard model image.

If the object image and the standard model image accurately coincide with each other, the brightness of the light incident onto the sensor pixel 20 of the optical sensor 18 is possible from "0" only to "0.25," and the optical sensor 18 outputs only a digital electrical signal approximately corresponding to $0^{th}$, first, and second grades. If the object image and the standard model image do not coincide with each other, the brightness of the light incident onto the sensor pixel 20 of the optical sensor 18 is possible from "0" to "1," and the optical sensor 18 only outputs a digital electrical signal corresponding to "0" and "1," i.e., $0^{th}$ through tenth grades. In this case, an image difference between the object image and the standard model image is checked from an arrangement of digital electrical signals between the object image and the standard model image.

Accordingly, if the object image and the standard model image accurately coincide with each other, the optical sensor 18 may output an electrical signal corresponding to the standard model image so as to display the electrical signal on the external display device. Also, if the object image and the standard model image do not accurately coincide with each other, the optical sensor 18 may output an electrical signal corresponding to the optical difference between the object image and the standard model image or may display the electrical signal on the external display device.

Figure 4:
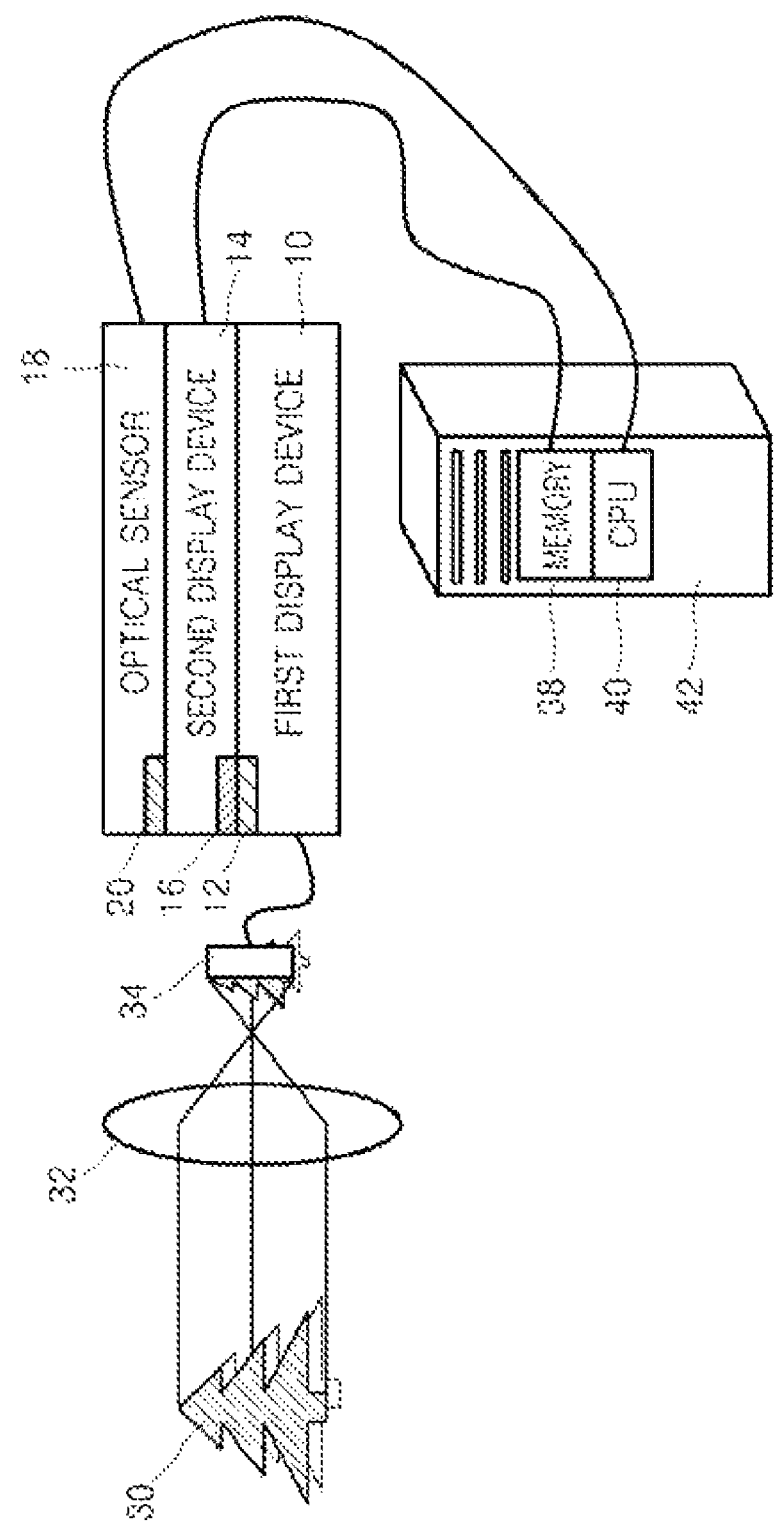
FIG. 4 illustrates an image recognition method using the OVC of FIG. 1.

FIG. 4 illustrates an image recognition method using the OVC of FIG. 1.

In detail, an object image 30 is focused on an external optical sensor 34 through a lens 32, and an electrical signal output from the external optical sensor 34, which is a CMOS sensor, is displayed as the object image 30 on the first display device 10. A computer 42 reads a standard model image approximate to the object image 30 from a memory 38 and displays the standard model image on the second display device 14.

The optical sensor 18 of the OVC outputs a difference between the object image 30 and the standard model image as an electrical signal, and a central processing unit (CPU) 40 of the computer 42 analyzes the electrical signal. If the difference is greater than a predetermined reference value according to the analysis result of the CPU 40, a process of displaying another standard model image stored in the memory 38 or a database (DB) on the second display device 14 and comparing the object image with the other standard model image is repeated. If the difference is less than the predetermined reference value, an object may be recognized as an object equal to a standard model. If the difference is not less than the predetermined reference value, the object may be recognized as a new object that is not stored in the memory 38 or the database (DB) and may be stored in the memory 38 or the database (DB).

The OVC may divide the object into individual portions to independently compare an image of the object with a standard model image through processes as described above. The standard model image should be developed to recognize the image of an object using the OVC of the present invention. Also, there may be required software for recognizing an approximate contour of the object image to read a standard model image approximate to the object image and analyzing a difference between the object image and the standard model image. However, the OVC directly compares the object image with the standard model image and thus may further easily recognize the image of the object as compared to a conventional image recognition method.

Figure 5:
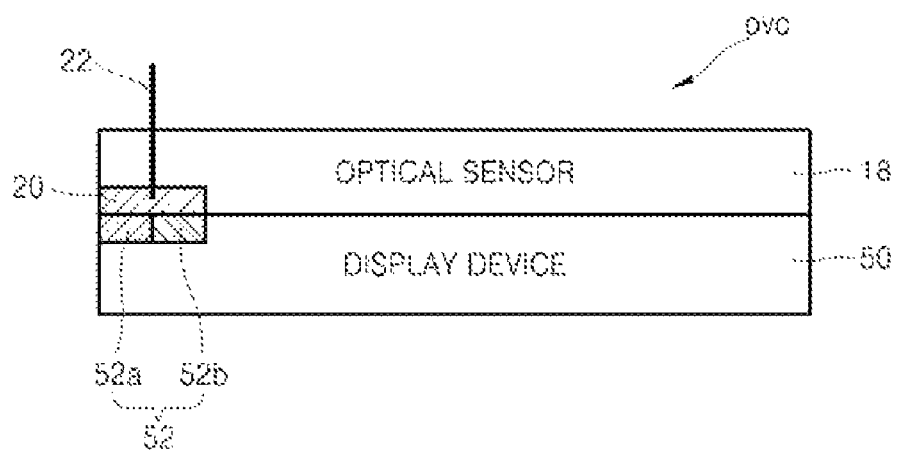
FIG. 5 is a cross-sectional view of an OVC according to another embodiment of the present invention.

FIG. 5 is a cross-sectional view of an OVC according to another embodiment of the present invention. Here, the same reference numerals of FIG. 5 as those of FIG. 1 denote the same elements.

Referring to FIG. 5, the OVC of the present embodiment includes a display device 50 and the optical sensor 18. A pixel 52 of the display device 50 opposite to a sensor pixel 20 of the optical sensor 18 is divided into first and second sub pixels 52a and 52b.

The OVC has a structure in which the display device 50 and the optical sensor 18 are stacked to be arranged and adhered onto each other. The size of the sensor pixel 20 of the optical sensor 18 is the same as that of the pixel 52 of the display device 50, and the first and second sub pixels 52a and 52b are adhered onto the sensor pixel 20. The first and second sub pixels 52a and 52b are respectively connected to different electrodes inside the display device 50 so as to operate as two independent display elements. The display device 50 may be an LCD, a PDP, an OLED, or a CRT, which are generally used as display devices, preferably, may be the LCD.

An image recognition method using the OVC of FIG. 5 will now be described. The image recognition method is approximately equal to the image recognition method using the OVC of FIG. 1. Here, the first and second sub pixels 52a and 52b perform functions respectively corresponding to those of the first and second pixels 12 and 16 of the first and second display devices 10 and 14 of the OVC of FIG. 1.

In detail, an object image is displayed on the first sub pixel 52a, and a standard model image is displayed on the second sub pixel 52b. When the standard model image is displayed on the second sub pixel 52b, the brightness magnitude of the standard model image is displayed as a complementary magnitude to the object image. In this case, an image difference between the object image and the standard model image can be more clearly realized according to an electrical signal output from the sensor pixel 20 of the optical sensor 18 than in the previous embodiment described with reference to FIG. 1.

For example, it is assumed that the first and second sub pixels 52a and 52b of the display device 50 each have a 10 grade brightness from "0" to "1." If the object image and the standard model image accurately coincide with each other, the brightness of light incident onto the sensor pixel 20 of the optical sensor 18 is "1." In other words, if the brightness of the first pixel 52a of the object image is "x," the complementary brightness of the standard model image is "1−x." Thus, the brightness of the light incident onto the sensor pixel 20 of the optical sensor 18 is "1," which is the sum of the brigntnesses of the object image and the standard model image.

Accordingly, the optical sensor 18 checks the difference between the object image and the standard model image based on the brightness of the light incident onto the sensor pixel 20 deviating from "1" so as to output a digital electrical signal corresponding to the difference. In this case, the difference between the object image and the standard model image can be checked from an arrangement of digital electrical signals between the object image and the standard model image.

Figure 6:
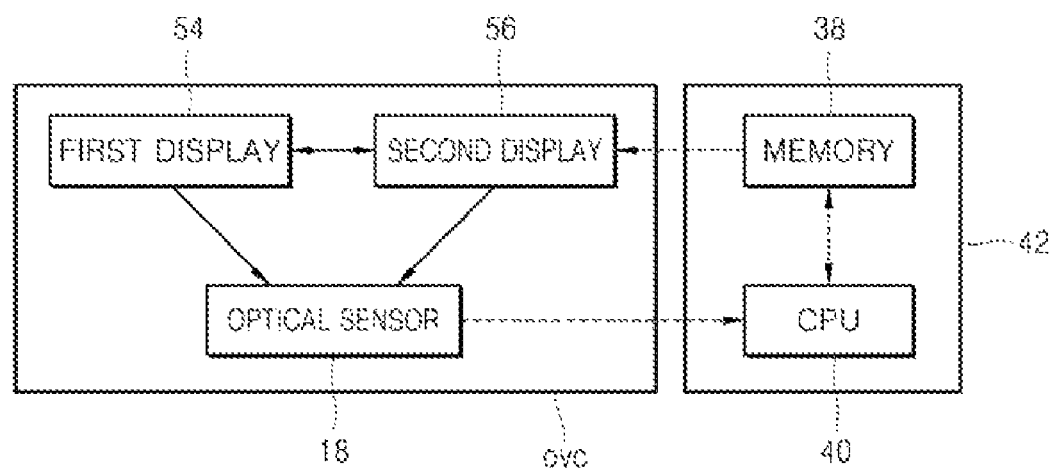
FIG. 6 is a block diagram illustrating a structure of the OVC of FIG. 1 or 5 and an image recognition method using the OVC, according to an embodiment of the present invention.

FIG. 6 is a block diagram illustrating a structure of the OVC of FIG. 1 or 5 and an image recognition method using the OVC, according to an embodiment of the present invention.

In detail, an object image is displayed on a first display 54 that corresponds to the first display device 10 in FIG. 1, however, also corresponds to the first sub pixel 52a of the display device 50 in FIG. 5. A standard model image is read from the memory 38 of the computer 42 and then displayed on a second display 56 that corresponds to the second display device 14 in FIG. 1, however, also corresponds to the second sub pixel 52b of the display device 50 in FIG. 5. When the standard model image is displayed on the second display 14, the brightness magnitude of the standard model image is displayed as a complementary to the object image.

The optical sensor 18 performs optical coupling between the first and second displays 54 and 56, i.e., combines the brightnesses of the light output from the first and second displays 54 and 56, and then outputs a difference between the object image and the standard model image as an electrical signal. If the CPU 40 of the computer 42 analyzes the electrical signal output from the optical sensor 18 to detect the difference between the object image and the standard model image and transmits the difference to an external display device (not shown), the external display device may optically display the difference. In FIG. 6, solid line arrows and dotted line arrows denote optical correlations and electrical correlations between elements, respectively.

Figure 7:
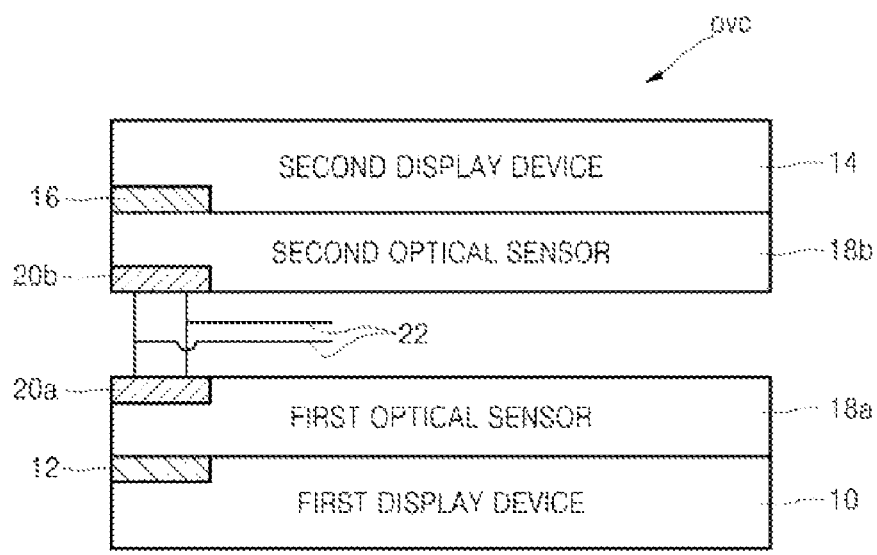
FIG. 7 is a cross-sectional view of an OVC according to another embodiment of the present invention.

FIG. 7 is a cross-sectional view of an OVC according to another embodiment of the present invention. Referring to FIG. 7, the OVC of the present embodiment includes two display devices, i.e., first and second display devices 10 and 14, and first and second optical sensors 18a and 18b that are respectively adhered to the first and second display devices 10 and 14. In the present embodiment, first and second sensor pixels 20a and 20b respectively of the first and second optical sensors 18a and 18b are electrically connected to each other.

The first optical sensor 18a has the first sensor pixel 20a arranged and adhered over the first pixel 12 of the first display device 10, and is adhered onto the first display device 10. The second optical sensor 18b has the second sensor pixel 20b arranged and adhered below the second pixel 16 of the second display device 14, and is adhered to the second display device 14. The first display device 10, the first optical sensor 18a, the second optical sensor 18b, and the second display device 14 are sequentially stacked so as to arrange and adhere the first pixel 12, the first sensor pixel 20a, the second sensor pixel 20b, and the second pixel 16 having the same size. The first and second display devices 10 and 14 may be LCDs, PDPs, OLEDs, or CRTs, which are generally used as display devices, preferably, may be LCDs.

An object image is displayed on the first display device 10 of the OVC having the above-described structure, and a standard model image having a complementary brightness magnitude to the object image is displayed on the second display device 14. In this case, an electrical coupling (integration) signal, which is output from the first and second sensor pixels 20a and 20b of the first and second optical sensor 18a and 18b through an electrode line 22 is equal to the electrical signal as described for the OVC illustrated in FIG. 5. In other words, the object image is optically combined with the complementary standard model image in FIG. 5, however, the object image is electrically combined with the complementary standard model image in FIG. 7, Accordingly, if the object image and the standard model image accurately coincide with each other as described for the OVC in FIG. 5, the electrical coupling signal output from the first and second sensor pixels 20a and 20b of the first and second optical sensors 18a and 18b corresponds to a brightness "1" of light. Thus, a difference between the object image and the standard model image is checked based on the electrical coupling signal which is output to the first sensor pixel 20a or the second sensor pixel 20b and deviates from the brightness "1" of the light.

Figure 8:
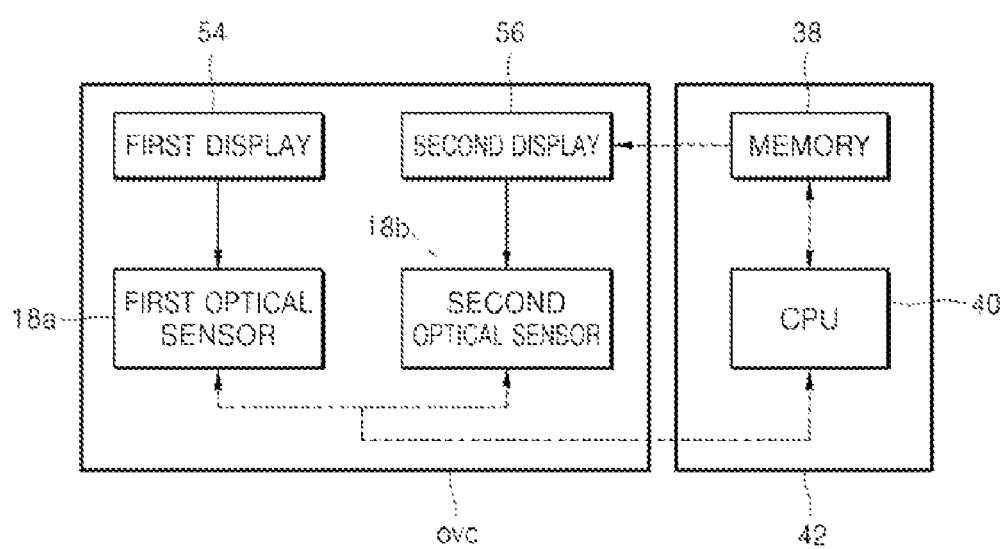
FIG. 8 is a block diagram illustrating a structure of the OVC of FIG. 7 and an image recognition method using the OVC.

FIG. 8 is a block diagram illustrating a structure of the OVC of FIG. 7 and an image recognition method using the OVC. Referring to FIG. 8, an object image is displayed on the first display 54 that corresponds to the first display device 10 in FIG. 1, however, also corresponds to the first sub pixel 52a of the display device 50 in FIG. 5. A standard model image is read from the memory 38 of the computer 42 and then displayed on the second display 56 that corresponds to the second display device 14 in FIG. 1, however, also corresponds to the second sub pixel 52b of the display device 50 in FIG. 5. When the standard model image is displayed on the second display device 14, the brightness magnitude of the standard model image is displayed as a complementary the object image.

The first optical sensor 18a outputs an electrical signal of the object image displayed on the first display 54, and the second optical sensor 18b outputs an electrical signal of the standard model image displayed on the second display 56. The electrode line 22 couples the electrical signals output from the first and second optical sensors 18a and 18b and outputs a difference between the object image and the standard model image as the coupled electrical signal.

If the CPU 40 of the computer 42 analyzes the coupled electrical signal to detect the difference between the object image and the standard model image and transmits the difference to an external display device (not shown), the external display device may optically display the difference. In FIG. 8, solid line arrows and dotted line arrows denote optical correlations and electrical correlations between elements, respectively.

Figure 9:
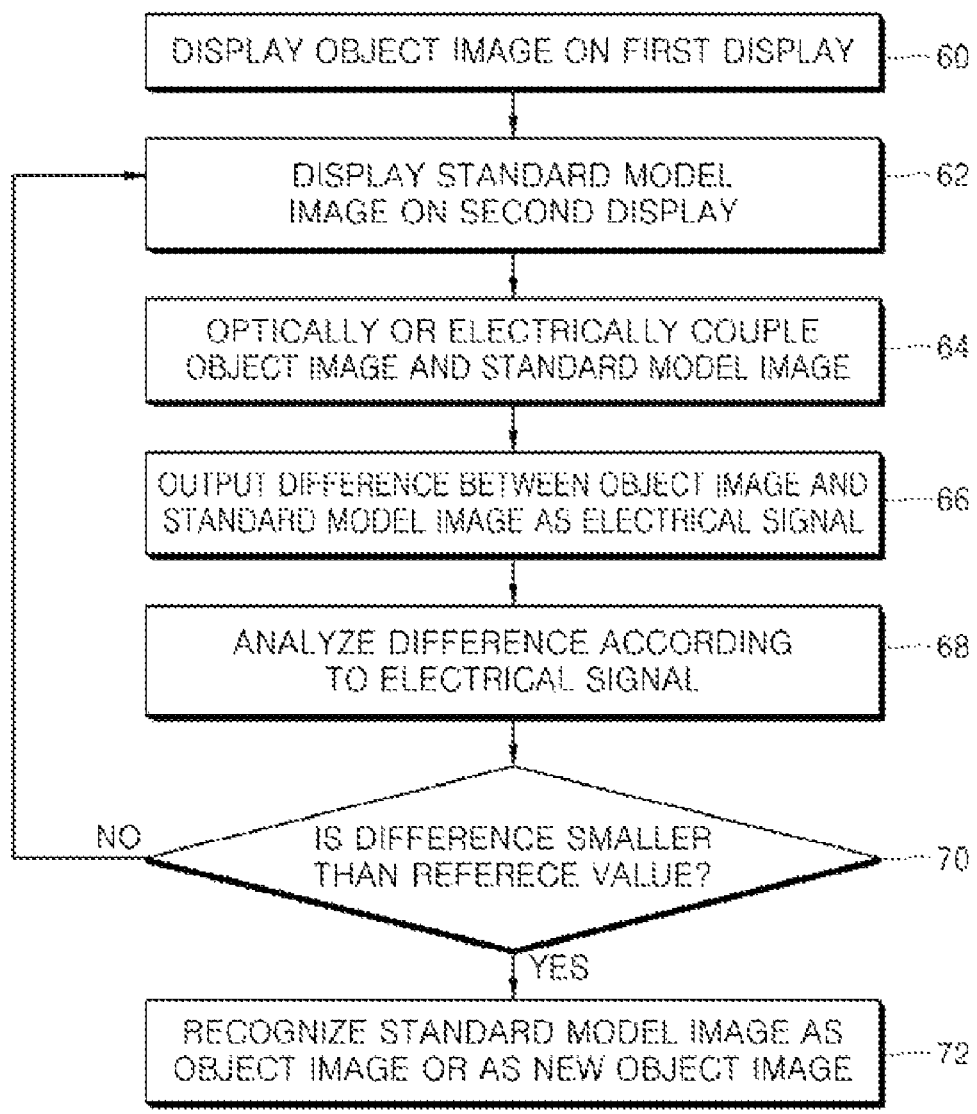
FIG. 9 is a flowchart of an image recognition method using an OVC according to an embodiment of the present invention.

FIG. 9 is a flowchart of an image recognition method using an OVC according to an embodiment of the present invention.

Referring to FIG. 9, in operation 60, an object image is displayed on a first display of the OVC using an external optical sensor. In operation 62, a standard model image is displayed on a second display, such that the standard model image is read from a memory of a computer and then displayed on the second display.

In operation 64, the object image and the standard model image are optically or electrically processed. In other words, the object image and the standard model image is optically coupled to each other as described with reference to the OVCs of FIGS. 1 and 5 or electrically coupled to each other using an optical sensor as described with reference to the OVC in FIG. 7.

In operation 66, a difference between the object image and the standard model image is output as an electrical signal. In operation 68, the electrical signal is analyzed based on the difference. Here, a CPU of a computer analyzes the electrical signal based on the difference.

In operation 70, a determination is made as to whether the difference is greater or less than a reference value according to the analysis result of the electrical signal. If it is determined in operation 70 that the difference is greater than the reference value, the standard model image stored in the memory is displayed on a second display device operations 60, 62, 64, 66, and 68 are repeated. If it is determined in operation 70 that the difference is less than the reference value, in operation 72, the object image is recognized as an object equal to the standard model image or is recognized as a new object and then stored in the memory.

As described above, an OVC according to the present invention can directly compare an object image with a standard model image, optically or electrically couple the object image to the standard model image, and output a difference between the object image and the standard model image as an electrical signal. The OVC also implements an image recognition method that is accurate in recognizing an image, and be a core device in an image recognition system.

Also, since the OVC directly compares the object image and the standard model image and optically or electrically couples the object image and the standard model image, the OVC can recognize an image without computing complicated mathematical formulas or calculations.

In addition, the OVC can easily be used in the image recognition system using a technique of arranging and adhering a display device and an optical sensor.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical vision chip (OVC) comprising:
   a display device having a first sub pixel and a second sub pixel, the first sub pixel displaying an object image, the second sub pixel displaying a standard model image; and
   an optical sensor having a sensor pixel, the optical sensor optically coupling the object image and the standard model image respectively displayed on the first and second sub pixels and outputting a difference between the object image and the standard model image as an electrical signal,
   wherein the first and second sub pixel are disposed side by side to collectively form a pixel that has the same size as the sensor pixel,
   wherein the display device and the optical sensor are sequentially stacked, such that the sensor pixel is in contact with both a top surface of the first sub pixel and a top surface of the second sub pixel.

2. The OVC of claim 1, wherein the first sub pixel has the same size as the second sub pixel, and said sensor pixel exactly overlaps said pixel formed collectively by the first and second sub pixels.

3. The OVC of claim 1, wherein the first sub pixel has a first value of brightness, the second sub pixel has a second value of brightness, and a brightness of a light incident onto the sensor pixel is sum of the first value and the second value.

4. An optical vision chip (OVC) comprising:
   a first display displaying an object image and comprising a first pixel;
   a first optical sensor adhered to the first display and comprising a first sensor pixel, the first optical sensor outputting an electrical signal of the object image;
   a second display displaying a standard model image and comprising a second pixel; and
   a second optical sensor adhered to the second display and comprising a second sensor pixel, the second optical sensor outputting an electrical signal of the standard model image,
   wherein the electrical signal of the object image is coupled with the electrical signal of the standard model image, and a difference between the object image and the standard model image is outputted as a coupled electrical signal.

5. The OVC of claim 4, wherein the second display displays a standard model image having a complementary brightness magnitude to the object image.

6. The OVC of claim 4, wherein the first display, the first optical sensor, the second optical sensor, and the second display are sequentially stacked in this order.

7. An image recognition method comprising:
   displaying an object image on a first display of an OVC;
   displaying a standard model image on a second display of the OVC;
   optically coupling the object image to the standard model image;
   outputting a difference between the object image and the standard model image as an electrical signal;
   analyzing the electrical signal based on the difference to determine whether the difference is greater or less than a reference value; and
   if the difference is greater than the reference value, displaying a second standard model image on the second display and repeat the previous operations, and if the difference is less than the reference value, recognizing the object image as an object equal to the standard model image or as a new object,
   wherein the optical coupling between the object image and the standard model image is performed using the OVC which comprises a display device and an optical sensor, the display device having a first sub pixel and a second sub pixel, the optical sensor having a sensor pixel, the first sub pixel being the first display, the second sub pixel being the second display, and
   wherein the first and second sub pixel are disposed side by side to collectively form a pixel that has the same size as the sensor pixel, and the display device and the optical sensor are sequentially stacked, such that the sensor pixel is in contact with both a top surface of the first sub pixel and a top surface of the second sub pixel.

8. The image recognition method of claim 7, wherein the object image displayed on the first display is obtained using an external optical sensor, and the standard model image and the second standard model image are read from a memory of a computer.

9. The image recognition method of claim 7, wherein the standard model image is displayed as a complementary brightness magnitude to the object image.

10. An image recognition method using an OVC, the OVC comprising:
    a first display comprising a first pixel;
    a first optical sensor adhered to the first display device and comprising a first sensor pixel;
    a second display comprising a second pixel; and
    a second optical sensor adhered to the second display device and comprising a second sensor pixel,
    the method comprising:
    displaying an object image on the first display;
    displaying a standard model image on the second display;
    outputting an electrical signal of the object image by the first optical sensor;
    outputting an electrical signal of the standard model image by the second optical sensor;
    coupling the electrical signal of the object image and the electrical signal of the standard model image;
    outputting a difference between the object image and the standard model image as a coupled electrical signal;
    analyzing the coupled electrical signal based on the difference to determine whether the difference is greater or less than a reference value; and
    if the difference is greater than the reference value, displaying a second standard model image on the second display and repeat the previous operations, and if the difference is less than the reference value, recognizing the object image as an object equal to the standard model image or as a new object.

* * * * *